(No Model.)
S. M. LILLIE.
EVAPORATING APPARATUS.
No. 498,938. Patented June 6, 1893.
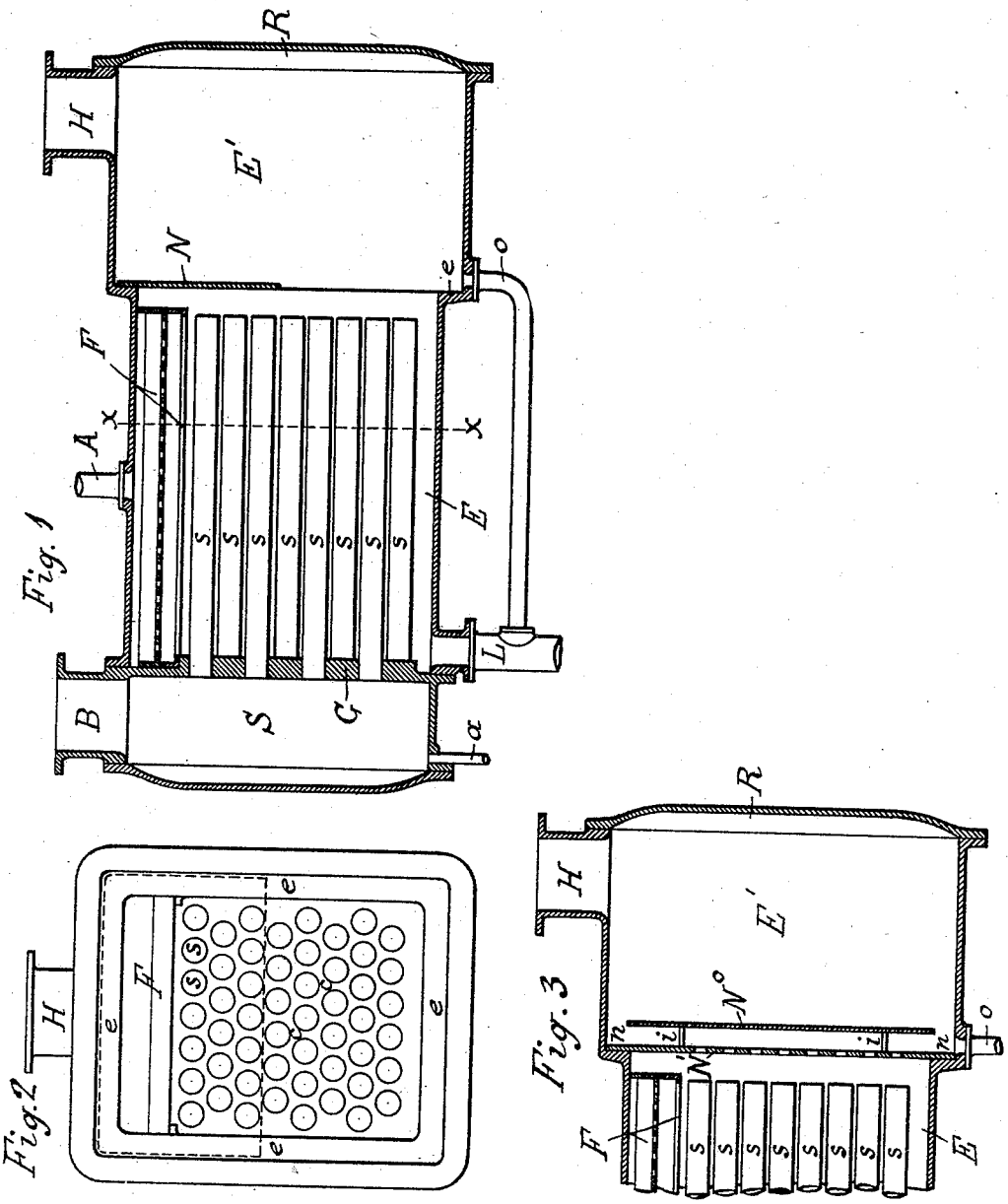
WITNESSES:
S. Morris Lillie INVENTOR

UNITED STATES PATENT OFFICE.

SAMUEL MORRIS LILLIE, OF PHILADELPHIA, PENNSYLVANIA.

EVAPORATING APPARATUS.

SPECIFICATION forming part of Letters Patent No. 498,938, dated June 6, 1893.

Application filed September 24, 1892. Serial No. 446,757. (No model.)

*To all whom it may concern:*

Be it known that I, SAMUEL MORRIS LILLIE, a resident of Philadelphia, in the county of Philadelphia and State of Pennsylvania, have invented new and useful Improvements in Evaporating Apparatus, of which the following is a specification, reference being had to the accompanying drawings.

My invention relates more particularly to the class of evaporating apparatus illustrated in patents issued to me as follows: No. 422,235, dated February 25, 1890, and No. 440,231, dated November 11, 1890, that is to apparatus in which the liquid to be evaporated is discharged from above by suitable devices over the exterior surfaces of internally heated tubes contained in a chamber, but it is also applicable to the apparatus shown in said patents when placed with their tubes vertical, as hereinafter pointed out.

The object of my invention is to provide means for separating suspended particles of liquid from the vapors evolved during evaporation before they pass from the apparatus, and therefore prevent loss of liquor by suspension in the escaping vapors, and it consists in lengthening the chamber containing the evaporating tubes in the direction to the length of the tubes to form a large subsiding chamber into which the vapors of evaporation pass and in which suspended particles of liquid may settle from the vapors, and from which the latter escape through an outlet provided for the purpose.

In the drawings are shown, as illustrating my invention, modified constructions of the evaporators described and figured in my said prior patents.

Figure 1 is a longitudinal view of an evaporator embodying my invention. Fig. 2 is an end view of Fig. 1 with the plate R and baffle plate N removed to expose the interior to view, the position occupied by the baffle plate, if not removed, being indicated by the dotted lines. Fig. 3 is a portion of a longitudinal section of an evaporator showing a second construction of the baffle plate.

Referring to the drawings, Figs. 1 and 2, E is a chamber containing a battery of horizontal and parallel evaporating tubes $s, s$, &c., which are supported in, and open through the heavy tube plate G, closing one end of the chamber, into the chamber S, which is supplied with steam through the main B and in turn supplies steam, the heating agent, to the interiors of the evaporating tubes $s, s$, &c. At their ends opposite the steam chamber S the evaporating tubes are closed. Above the evaporating tubes is a series of perforated distributing plates F, upon which, during the operation of the apparatus, the liquid to be evaporated is delivered through the main A, and which in turn shower it upon the evaporating tubes $s, s$ down over whose surfaces the liquid trickles and finally falls upon the bottom of the chamber and flows away by the main L. The evaporating chamber E is extended in the direction of the length of the evaporating tubes to form the large subsiding chamber E' which is made preferably somewhat larger in cross section than the evaporating chamber so as to form the shoulder $e$, against which may rest baffle plates hereinafter to be described. The subsiding chamber E' has its end opposite the chamber E formed of a door or easily removable plate R. It is provided with a vapor escape main H, and a drain pipe $o$, which may lead into the pipe L. Unless the liquid to be evaporated boils very gently, a baffle plate of some suitable construction as N Fig. 1, or N' Fig. 3, is placed in the subsiding chamber E' to assist in separating suspended particles of liquid from the vapors of evaporation. In Fig. 1, and as indicated by dotted lines in Fig. 2, the baffle plate is a simple plate resting against the shoulder $e$ and extending across the chambers and from the top partway toward the bottom, the vapors issuing from the chamber E being deflected by it toward the bottom of the chamber E'. In Fig. 3 the baffle plate is shown of the construction I prefer to use when the liquid to be evaporated is of a foamy nature. It consists of a perforated plate N' resting against the shoulder $e$ on all four sides of the apparatus and completely closing, save for its perforations, communication between the chambers E and E'. A little in front of the perforated plate N', i. e. on the chamber E' side, a solid baffle plate N° parallel to plate N' is suitably supported, as by studs $i$ extending between it and the plate N'. The plate N° should extend far enough toward the four sides of the chamber E' to cover all the perforations in the plate N'. The space between the two plates N' and N° communicates with the subsiding chamber E' by passages n around the edges of the plate N°, the edges of the plate being near enough to the walls of the chamber so that the vapors escaping, as hereinafter described, will be compelled to impinge against the walls of the chamber. The plate R is made easily removable, and also the baffle plates when used, in order that easy access may be had to the interior of the evaporating chamber E.

The operation of this apparatus is as follows: The liquid to be evaporated is delivered by the pipe A upon the distributing plates F and by them is showered upon the battery of heated evaporating tubes s, s, &c., below, down over whose surfaces it trickles, suffering evaporation in its course, and falls concentrated upon the bottom of the evaporating chamber and thence flows away by the pipe L. The vapors resulting from the evaporation escape from the longitudinal spaces c between the tubes, and pass into the subsiding chamber E' in which any particles of liquor which may be suspended in the vapors subside, and from which the vapors escape by the main H, comparatively free from liquid in suspension. Steam to produce the evaporation is supplied through the main B to the chamber S, whence it passes into the interiors of the evaporating tubes s, s, on whose surfaces it condenses, its latent heat, passing by conduction through the walls of the tubes, causing evaporation from the liquid in contact with their outer surfaces, while the water of condensation flows back from the tubes into the chamber S, and away from the latter by the drip pipe a. The baffle plates, when used, assist to a greater or less extent the separation of suspended particles of liquid from the vapors. The baffle plate N, shown in Fig. 1, assists to a considerable extent by deflecting the vapors downward into the subsiding chamber E', i.e. away from the vapor escape main H, so that they may have a longer distance to travel in the subsiding chamber, and a greater opportunity of depositing the suspended liquid they may contain before passing out through the vapor escape. Baffle plates of the type N', shown in Fig. 3, give most effective assistance. They are of a type that I have found very effective when strongly foaming liquids are to be evaporated, and for which I consequently hereinafter make a specific claim. As hereinbefore stated the baffle plate N' completely separates the chamber E from the subsiding chamber E', save for the perforations or passages through it, which in the drawings, it will be observed, are opposite the ends of the evaporating tubes instead of the longitudinal spaces c between the tubes. The vapors generated in the evaporating chamber E, from the surfaces of the evaporating tubes, move along the longitudinal spaces c between the evaporating tubes and impinge against the inner face of the plate N' by whose surface much of the liquid which is drawn along by the vapors is stopped and separated from the latter. The vapors then pass through the perforations in the plate and impinge against the inner surface of the plate N°, by which another portion of suspended liquid is separated from the vapors, and by which the latter are deflected along the space between the two plates whence they merge into the subsiding chamber E' through the passages n after impinging against and being deflected by the walls of said chamber. At each impinging and deflection the vapors give up some of their suspended liquor and the result is they enter the subsiding chamber E' comparatively free of liquid in suspension. When this form of baffle plate is used, the pipe o serves to drain the subsiding chamber E' of whatever liquid there may be carried into it by the vapors.

If this apparatus is stood vertically with the settling chamber E' up, it may be used for evaporating liquids "en masse" instead of in thin films. The dilute liquid would be fed to the evaporating chamber by the pipe A, the thickened liquid would be drawn away through the pipe L, and the liquid in the evaporating chamber would be kept at a level of say the dotted line x, x. The vapors resulting from evaporation would pass upward, around or through the baffle plates if used, into the subsiding chamber E' and then away by the vapor main H.

Thus, having described my invention, I claim—

1. The combination in an evaporating apparatus of an evaporating chamber, a battery of horizontal evaporating tubes contained therein opening at one end through a tube plate into a steam supply chamber and having their other ends closed, a subsiding chamber consisting of an elongation of the evaporating chamber beyond the closed ends of the tubes, a vapor escape main leading from the subsiding chamber, suitable pipes for leading the liquid to be concentrated by evaporation into the evaporating chamber and the concentrated liquid away from the evaporating chamber, and means for causing the liquid entering the evaporating chamber to flow in thin films over the exterior surfaces of the evaporating tubes, substantially as specified.

2. The combination in an evaporating apparatus of an evaporating chamber, a battery of evaporating tubes contained therein opening at one end through a tube plate into a steam supply chamber and having their other ends closed, a subsiding chamber consisting of an elongation of the evaporating chamber beyond the closed ends of the tubes, a vapor escape main leading from the subsiding chamber, baffle plates located in the subsiding chamber and suitable liquid induction and eduction pipes for the evaporating chamber substantially as and for the purpose specified.

3. The combination in an evaporating apparatus having evaporating chamber, evaporating tubes and subsiding chamber substantially as described, of a transverse plate with vapor escape holes through it, dividing the evaporating chamber from the settling chamber, and a baffle plate in the settling chamber in front of the said perforated dividing plate, substantially as and for the purpose specified.

4. In an evaporating apparatus constructed substantially as described, a shoulder formed between the evaporating chamber and the subsiding chamber by making the subsiding chamber of greater cross section than the evaporating chamber, and baffle plates supported against the said shoulder substantially as and for the purpose specified.

S. MORRIS LILLIE.

Witnesses:
M. TEMPLETON,
PAUL R. BROWN.